Patented Oct. 9, 1923.

1,470,039

UNITED STATES PATENT OFFICE.

ROGER N. WALLACH, OF NEW YORK, N. Y., ASSIGNOR TO THE GRASSELLI CHEMICAL COMPANY, A CORPORATION OF OHIO.

PROCESS OF MAKING 2-3 OXY-NAPHTHOIC ACID.

No Drawing.      Application filed July 19, 1922. Serial No. 576,118.

*To all whom it may concern:*

Be it known that I, ROGER N. WALLACH, a citizen of the United States of America, residing at 401 West End Avenue, New York, in the county of New York and State of New York, have invented certain new and useful Improvements in Process of Making 2-3 Oxy-Naphthoic Acid, of which the following is a specification.

This invention relates to an improvement in the process of reacting with carbon dioxid upon alkali-beta-naphtholate, which improvement reduces to a minimum any secondary reactions and allows of a very high yield of 2-3-oxy-naphthoic acid. It consists specifically in dissolving the alkali beta-naphtholate in an appropriate solvent and acting at relatively high temperature and pressure with carbon-dioxid upon this solution.

By reacting with carbon dioxid upon alkali-beta-naphtholate two isomers are formed: the alkali salt of the 2-1-oxy-naphtholate acid and the alkali salt of the desired 2-3-oxy-naphthoic acid:

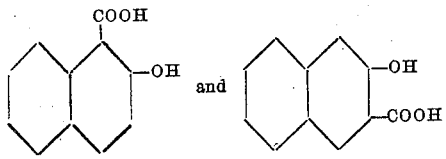

At a relatively lower temperature, that is to say, below about 180° C., where the action of carbonic acid gas runs smoothly, the 2-1-derivative is formed in larger amounts; at higher temperatures the formation of the 2-3 derivative prevails, but the 2-1 derivative formed at the same time undergoes secondary reactions with formation of water, which decrease the yield of the desired product and form tarry matters; these latter are more or less difficult to separate from the oxy-naphthoic acid.

In order to decrease the formation of such by-products and decomposition products the concentration of water must be kept as low as possible. This might be achieved by keeping the temperature below the point where the decomposition of the 2-1 oxy-naphthoic acid becomes noticeable. Under such conditions, however, the amount of 2-3 isomer obtained is relatively small, and inasmuch as there is only a very limited technical use for the 2-1 oxy-naphthoic acid the process becomes very uneconomical.

I have now found that the action of carbon dioxid gas upon alkali-beta-naptholates can be carried out at a temperature above the normal decomposition point of the 2-1 oxy-naphthoic acid, provided the alkali-beta-naphtholate be dissolved in an appropriate solvent and the carbonic acid gas permitted to react upon such solution. In this case not only is the concentration of the water formed by secondary reactions much lower, due to the diluent effect of the added solvent; but I have observed the unexpected fact that at a given temperature the proportionate amount of 2-1 isomer, and consequently the corresponding amount of decomposition products, naphthoxanthrone and water, derived therefrom, is much lower.

As a solvent in which to dissolve the alkali-beta-naphtholate for this reaction I prefer beta-naphthol. At the reaction temperature alkali-beta-naphtholate is soluble or miscible in all proportions in beta-naphthol, and such solutions form thin liquids, which are easily stirred and through which carbon dioxid can be bubbled without any difficulty. Other phenolic bodies including alpha-naphthol, phenol, etc. might satisfactorily perform the functions of a solvent, but are far less desirable than beta-naphthol by reason of the contamination of the end product.

The process is further illustrated by the following examples, to which however the invention is not limited.

*Example I.*—In a suitable apparatus equipped with a stirrer and appropriate devices for measuring temperatures and pressures, 500 parts of anhydrous sodium beta-naphtholate are dissolved at 225° C. in 432 parts of beta-naphthol. Carbonic acid gas is pumped into this solution so as to reach a pressure of 200–300 lbs. per square inch. The carbonic acid gas is readily absorbed. The pressure of 200–300 lbs. and a temperature of 225–250° C. are maintained for about one hour. After cooling, the contents of the apparatus are extracted with water and the reaction products; the sodium salt of the 2-3 oxy-naphthoic acid and beta-naphthol, are separated by well known methods.

*Example II.*—432 parts beta-naphthol and 192 parts technical potassium hydroxid are dissolved in as little water as possible. The solution is then evaporated to dryness and dehydrated at high temperature. To the anhydrous solid potassium beta-naphtholate thus obtained, 450 parts of molten beta-naphthol are added. The naphtholate dissolves; and the solution is heated to 250° C. Carbon dioxid is pumped into this solution and a pressure of 200–300 lbs. per square inch maintained for an hour. After cooling and releasing the excess pressure the 2-3 oxy-naphthoic acid formed is separated from the beta-naphthol by well known methods.

I claim:

1. Process of preparing 2-3 oxy-naphthoic acid, comprising reacting with carbon dioxid upon a melt containing alkali beta-naphtholate and beta-naphthol.

2. Process according to claim 1, wherein the temperature is maintained at approximately 200°–300° C., at super-atmospheric pressure.

3. Process of preparing 2-3 oxy-naphthoic acid, comprising dissolving anhydrous alkali beta-naphtholate in beta-naphthol, and subjecting the resulting solution to the action of carbon dioxid at a temperature approximating 200–300° C., under a pressure above 200 pounds per square inch.

In testimony whereof, I affix my signature.

ROGER N. WALLACH.